(12) United States Patent
Almog

(10) Patent No.: US 10,740,190 B2
(45) Date of Patent: Aug. 11, 2020

(54) SECURE DATA PROTECTION AND RECOVERY

(71) Applicant: Iron Mountain Incorporated, Boston, MA (US)

(72) Inventor: Eli Almog, Ramsey, NJ (US)

(73) Assignee: IRON MOUNTAIN INCORPORATED, Boston, MA (US)

( * ) Notice: Subject to any disclaimer, the term of this patent is extended or adjusted under 35 U.S.C. 154(b) by 0 days.

(21) Appl. No.: 16/130,247

(22) Filed: Sep. 13, 2018

(65) Prior Publication Data

US 2019/0087278 A1     Mar. 21, 2019

Related U.S. Application Data

(60) Provisional application No. 62/559,284, filed on Sep. 15, 2017.

(51) Int. Cl.
*G06F 11/14* (2006.01)
*G06F 21/64* (2013.01)
(Continued)

(52) U.S. Cl.
CPC ............ *G06F 11/1464* (2013.01); *G06F 8/41* (2013.01); *G06F 9/45558* (2013.01);
(Continued)

(58) Field of Classification Search
CPC ............. G06F 11/1461; G06F 11/1451; G06F 11/1458; G06F 8/41
See application file for complete search history.

(56) References Cited

U.S. PATENT DOCUMENTS

| 5,005,122 A | * | 4/1991 | Griffin | ............... G06F 8/61 370/401 |
| 7,111,192 B2 | | 9/2006 | Iguchi | |

(Continued)

FOREIGN PATENT DOCUMENTS

| EP | 1615131 | 1/2006 |
| WO | 2007044964 | 4/2007 |
| WO | 2016022257 | 2/2016 |

OTHER PUBLICATIONS

PCT/US2018/050840, "Invitation to Pay Add'l Fees and Partial Search Report", dated Jan. 3, 2019, 12 pages.
(Continued)

*Primary Examiner* — Ramon A. Mercado
(74) *Attorney, Agent, or Firm* — Kilpatrick Townsend & Stockton LLP

(57) ABSTRACT

Technologies are described herein for providing secure data protection and recovery. A virtual data center can be created on backup servers to manage data backup for a specific client. Backups can be performed by a master server in the virtual data center initiating a secure network connection with a client computing device at a random or pseudo random time within a backup window specified by the client. A backup agent on the client computing device can execute a data mover program complied at the client's computing system but received from the master server to retrieve and save backup data at a random or pseudo random temporary location. The saved data can be transmitted and stored on data storage accessible only by a storage server. Backup data can be inspected in an isolated inspection server and be made retrievable through a secure data repository accessible by the client.

20 Claims, 8 Drawing Sheets

(51) Int. Cl.
*G06F 21/62* (2013.01)
*G06F 8/41* (2018.01)
*G06F 9/455* (2018.01)
*H04L 29/06* (2006.01)
*H04L 29/08* (2006.01)

(52) U.S. Cl.
CPC ...... *G06F 11/1451* (2013.01); *G06F 11/1458* (2013.01); *G06F 11/1461* (2013.01); *G06F 21/6227* (2013.01); *G06F 21/645* (2013.01); *H04L 63/0428* (2013.01); *H04L 63/08* (2013.01); *H04L 63/123* (2013.01); *H04L 67/1097* (2013.01); *G06F 2009/45587* (2013.01); *G06F 2201/815* (2013.01); *H04L 67/34* (2013.01)

(56) References Cited

U.S. PATENT DOCUMENTS

| | | | |
|---|---|---|---|
| 7,337,286 | B1 | 2/2008 | West et al. |
| 7,739,242 | B2 | 6/2010 | Nakamura et al. |
| 8,510,596 | B1* | 8/2013 | Gupta ................ G06F 11/073 714/15 |
| 8,676,896 | B1* | 3/2014 | O'Neil ............... H04L 63/0428 709/206 |
| 8,868,858 | B2 | 10/2014 | Atluri |
| 9,015,527 | B2 | 4/2015 | Mohanta et al. |
| 9,778,865 | B1* | 10/2017 | Srinivasan ............ G06F 3/0619 |
| 2004/0103406 | A1* | 5/2004 | Patel ........................ G06F 8/41 717/140 |
| 2007/0100913 | A1* | 5/2007 | Sumner ............... G06F 11/1453 |
| 2009/0041230 | A1* | 2/2009 | Williams ............ G06F 11/1464 380/28 |
| 2012/0102088 | A1* | 4/2012 | Bindal ................ G06F 11/1461 709/203 |
| 2013/0091318 | A1* | 4/2013 | Bhattacharjee ..... G06F 12/1475 711/6 |
| 2014/0136832 | A1* | 5/2014 | Klum ................. H04L 63/0428 713/150 |
| 2014/0149701 | A1* | 5/2014 | Osada ................ G06F 11/1415 711/162 |
| 2014/0189432 | A1 | 7/2014 | Gokhale et al. |
| 2016/0110266 | A1 | 4/2016 | Nara et al. |
| 2016/0134701 | A1 | 5/2016 | Lentini et al. |
| 2017/0239576 | A1* | 8/2017 | Hsiao ..................... A63F 13/63 |
| 2018/0095900 | A1* | 4/2018 | Sarangdhar ......... G06F 12/1425 |

OTHER PUBLICATIONS

PCT/US2018/050840, "International Search Report and Written Opinion", dated Mar. 4, 2019, 18 pages.

International Application No. PCT/US2018/050840, International Preliminary Report on Patentability dated Mar. 26, 2020, 12 pages.

* cited by examiner

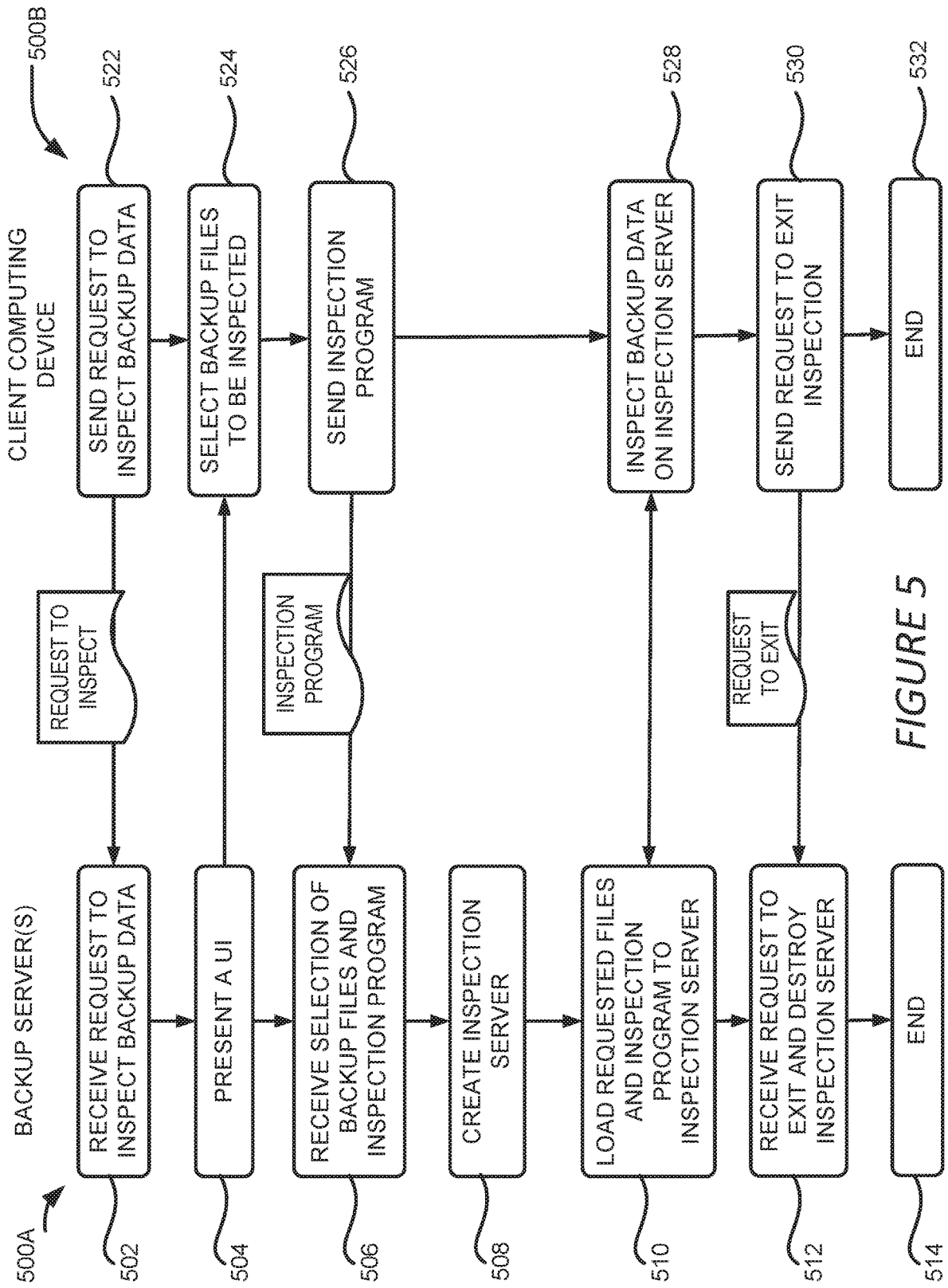

SECURE DATA PROTECTION AND RECOVERY

CROSS REFERENCE TO RELATED APPLICATIONS

This application is related to and claims priority benefits of U.S. Provisional Application No. 62/559,284 ("the '284 application"), entitled "Isolated Data Recovery" by inventor Eli Almog, filed on Sep. 15, 2017. The '284 application is hereby incorporated in its entirety by this reference.

TECHNICAL FIELD

The field of the present disclosure relates to computer security. More specifically, the present disclosure relates to improving data security and providing secure data protection and recovery.

BACKGROUND

In order to protect valuable data assets and prevent data loss, organizations typically backup their digital data automatically and create backup copies of the data at regular intervals, such as daily, weekly or other intervals deemed sufficient by the owner. The backup copies of the data may be stored at the same location as the primary data, or at a remote site. Generally, the backup copies are maintained for months, before the tape or disk drive, on which the information is stored, is recycled or overwritten.

Existing backup systems, however, are vulnerable to cyberattacks. Cybercriminals, once penetrating the organization's network, are often able to access and compromise the organization's primary data, and potentially the data backup because the backup data is not securely protected during and after the backup process. In addition, it is difficult to detect the compromised data as cyberattacks become more and more sophisticated and the existing systems generally are not designed to detect logical damages to the data. For example, cybercriminals might change the values of an important table in a database. Such damage can remain unnoticed for a long time going beyond the period for maintaining the backup copies. As a result, by the time the logical damage is detected, the backup copies have also been corrupted.

SUMMARY

The terms "disclosure," "the disclosure," "this disclosure" and "the present disclosure" used in this patent are intended to refer broadly to all of the subject matter of this application and the claims below. Statements containing these terms should be understood not to limit the subject matter described herein or to limit the meaning or scope of the claims below. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain aspects of the present disclosure, one example method for secure data protection and recovery includes, at a random or pseudo random time point within a backup window specified by a data owner, a backup sever initiates a connection for backing up data to a computing device of a computing system associated with the data owner. The backup server then sends a computer program to the computing device, the computer program being compiled in the computing system and causes the computer program to be executed on the computing device. The computer program is able to retrieve backup data from one or more storage devices associated with the data owner, to store the backup data at a random or pseudo random location in the computing system and to send the backup data to the backup server. After receiving the backup data from the computing device, the backup server causes the backup data to be stored in data storage.

According to certain aspects of the present disclosure, a secure data backup system includes one or more storage devices and one or more computing devices that execute a virtual data center to initiate a connection for backing up data to a computing system associated with a data owner at a random or pseudo random time point within a backup window specified by the data owner. The virtual data center sends to the computing system a computer program compiled in the computing system, and causes the computer program to be executed on the computing system. The computer program retrieves backup data from at least one storage device associated with the data owner, to store the backup data at a random or pseudo random location in the computing system and to send the backup data to the virtual data center. Further, the virtual data center receives the backup data from the computing system and store the backup data on the one or more storage devices.

According to certain aspects of the present disclosure, an example non-transitory computer-readable medium comprising computer-executable instructions to cause a computer to initiate a connection for backing up data to a computing device of a computing system associated with a data owner at a random or pseudo random time point within a backup window specified by the data owner. The computer-readable medium comprises further computer-executable instructions to causes the computer to send to the computing device a computer program compiled in the computing system and to cause the computer program to be executed on the computing device. The computer program retrieves backup data from at least one storage device associated with the data owner, to store the backup data at a random or pseudo random location in the computing system and to send the backup data to the computer. The computer-readable medium comprises further computer-executable instructions to causes the computer to receive the backup data from the computing device and to store the backup data on data storage.

According to certain aspects of the present disclosure, another example method for secure data protection and recovery includes receiving a source code of a computer program for backing up data and modifying the source code of the computer program to include information for accessing the backup data. The method further includes compiling the source code of the computer program to generate an executable computer program and sending the executable computer program to a backup server. The method also include accepting, at a computing device, a request for a secure connection for backing up data with the backup server and receiving the executable computer program from the backup server. The computing device can then execute the executable computer program to retrieve the backup data, save the backup data at a random or pseudo random location, and send the backup data to the backup server.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 5 includes flow chart diagrams that illustrate processes in a data inspection stage of the backup system, according to certain aspects of the present disclosure.

DETAILED DESCRIPTION

Figure 1:
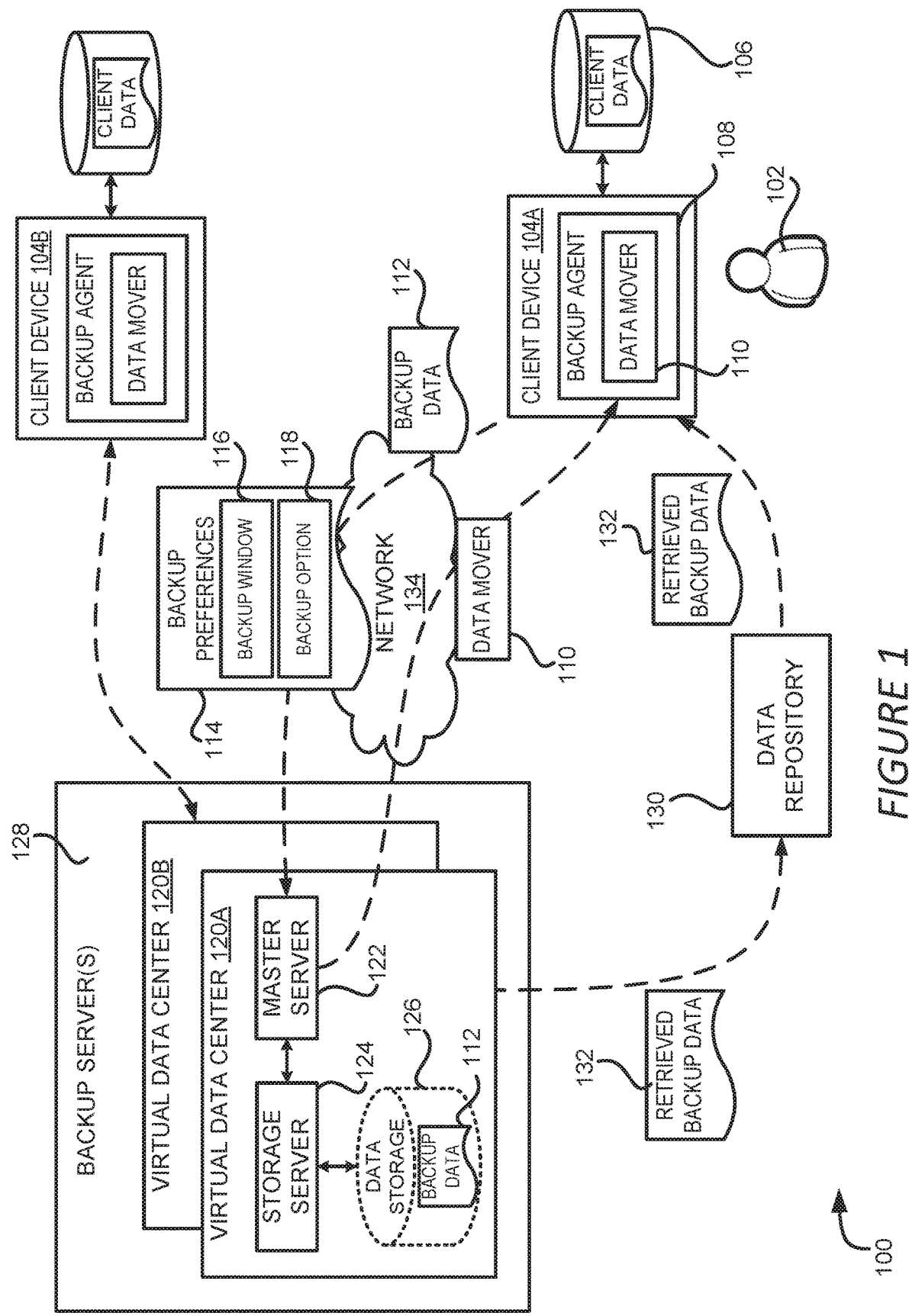
FIG. 1 shows a block diagram of a backup system providing secure data protection and recovery, according to certain aspects of the present disclosure.

The subject matter of embodiments of the present disclosure is described here with specificity to meet statutory requirements, but this description is not necessarily intended to limit the scope of the claims. The claimed subject matter may be implemented in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the disclosure relate to a data backup system for providing secure data protection and recovery. The data backup system includes one or more backup servers that provide data backup services to one or more clients. A client of the backup service, also referred to herein as "data owner," can include any entity or individual who has data to be protected and requests the data backup services by the backup servers. Although the term "data owner" is used herein, the entity or individual does not necessarily own the data, rather it can be in charge of protecting data owned by someone else. Further, the term "client" does not infer any relationship between the client and the backup servers other than the backup servers providing data backup for the client. The client/data owner can belong to the same entity/organization or different entities/organizations.

For each client of the backup services, the backup servers can build and maintain a virtual data center dedicated to that specific client. The virtual data center can include a master server to maintain an index of the backup data and metadata of the backup data, such as a time stamp of each backup, the version number of the backup, a size of the backup, and so on. The master server is also utilized to communicate with the client to perform backup operations, arrange inspection of backup data by the client, and deliver backup data for retrieval by the client.

The virtual data center for the client can also include secure data storage and a storage server to manage the secure data storage for storing and retrieving backup data. According to some aspects of the present disclosure, the data storage can include virtual data storage constructed based on a hyper-converged infrastructure ("HCI"). By using the HCI, the backup data for the client can only be accessed from the virtual data storage by the storage server through a handshaking process. This increased level of security can reduce the risks of the backup data being compromised through unauthorized access to the virtual data center.

During a setup stage of the backup process, the client can send the backup servers its backup preferences. The backup preferences can include a backup schedule including a preferred backup time window. The backup schedule can specify, for example, that the backup is to be performed regularly, such as daily, weekly, or monthly, and/or be performed when one or more specified events occurred. The preferred backup window can specify a time frame when the backup can take place. The backup preferences can also specify a backup option indicating how and where the backup data can be stored. The backup servers can then configure the virtual data center for the client based on the backup preferences.

In addition, to facilitate secure data backup, the backup servers can generate a computer program, also referred to herein as "data mover computer program" or "data mover," that can be customized by the client to, when executed on the client computing system, access the data storage of the client computing system and retrieve backup data. The backup servers can generate and send the source code of the data mover computer program to the client for customization. The customization can include, but is not limited to, modifying the source code to include locations and identifications of data to be backed up and login credentials to the client computing system for retrieving the identified data. The data mover can then be compiled and built on the client computing system. The compiled data mover can then be sent back to the backup servers for future use.

To start the backup operations, the backup servers can select a random or pseudo random time point within the backup window and initiate a secure connection for data backup with a client computing device. It may be noted that, for security reasons, the client may be prohibited from initiating the data backup connection. The backup servers can then send the data mover computer program to the client computing device. The client computing device can execute the received data mover computer program to retrieve data to be backed up. The retrieved data can be temporarily stored at a random or pseudo random location in the client computing system and then be transmitted to the backup servers. Upon receiving the data to be backed up, the backup servers can update the master server and send the data to the storage server for storing on the virtual data storage and/or other locations depending on the backup option specified by the client.

The client can, from time to time, request to inspect the backup data stored in the backup system. The inspection of a backup file can be performed by an administrator or other individuals authorized by the client opening the backup file to visually inspect its content or by executing an inspection computer program on the backup file to examine the integrity of its content. In either case, to prevent the backup file or the inspection computer program, which might have been compromised and contain malware, from contaminating the backup system, the backup servers can construct a virtual inspection server in an isolated environment and prohibit the virtual inspection server from accessing resources outside the inspection server. The virtual inspection server can be destroyed when the client finishes the inspection or upon discovering the contamination.

Backup data retrieval can be securely performed by requesting the storage server to retrieve the backup data from the virtual data storage upon receiving a retrieval request from a client. The retrieved backup data can be saved on a secure data repository accessible by the client so that the client can retrieve the backup data on its own. Additional details regarding these and other aspects of the techniques presented herein will be provided below with regard to FIGS. 1-7.

By utilizing the techniques presented herein, data can be securely backed up for a client on data storage and be safely recovered when needed. The techniques described herein improve the security of a computing system by providing a secure data backup system. Specifically, by storing backup data on data storage that is physically and logically separate from the client computing system, the techniques prevent cybercriminals from accessing both the primary and backup copies of the data by comprising the client computing system alone. In other words, accessing the backup data would require additional efforts from the cybercriminals to compromise the backup servers.

Furthermore, the techniques presented herein do not require the client computing system to be completely secure and the backup system can function well even if the client computing system has been compromised. This is ensured by various mechanisms presented herein that minimize the reliance on the client computing device when carrying out the backup operations and also confine the operations by the client computing device in an isolated environment. These mechanisms can eliminate possible damages to the backup data and the backup servers caused by a compromised client computing system. As a result, backup data can be securely protected against various cyberattacks even if the client computing device and the primary copy have been compromised. Other technical effects not specifically identified herein can also be realized through an implementation of the disclosed technologies.

Referring now to FIG. 1, details will be provided regarding a data backup system 100 for providing secure data protection and recovery according to aspects presented herein. As shown in FIG. 1, the data backup system 100 includes one or more backup servers 128 for providing data backup services to one or more clients. The backup servers 128 can build and maintain one or more virtual data centers 120A-120B for the one or more clients (which might be referred to herein as a virtual data center 120 or virtual data centers 120). Each of the virtual data centers 120 can be dedicated to one client.

A virtual data center 120 can include a master server 122 to maintain an index of the backup data for the client and other metadata of the backup data. For example, the master server 122 can maintain a record for data that have been backed up on the backup servers 128 for the client, including, but not limited to, a time stamp of each backup operation, a version number of the backup data, a size of the backup data, a type of the backup data, a storage location of the backup data, inspection record of the backup data and so on. As will be described in detail below, the master server is also employed to communicate with the client to perform backups, arrange inspections by the client on the backup data, deliver backup data for retrieval by the client and so on.

The virtual data center 120 for the client can also include a storage server 124 to manage saving and retrieving backup data 112 from data storage 126 that is dedicated to the client. To better protect the backup data 112, the data storage 126 can include a virtual data storage that is accessible only by the storage server 124. As a result, even a user 102 who has access to the virtual data center 120 would not be able to view or otherwise access the backup data 112 on the data storage 126. This mechanism provides additional protection to the backup data 112 by preventing attackers from accessing the backup data 112 even if they have gained access to the virtual data center 120. Additional details regarding the storage server 124 and the data storage 126 will be provided below with regard to FIG. 2.

Clients of the backup service can employ respective client computing devices 104A-104B (which might be referred to herein as a client computing device 104 or client computing devices 104) to communicate with the backup servers 128 through a network 134. The client computing device 104 can be a server computer, a personal computer, a desktop workstation, a laptop or tablet, a smartphone, a game console, a set-top box, or any other computing device capable of communicating with the backup servers 128 through the network 134.

To facilitate the backup operations, the client computing device 104 can be equipped with a backup agent 108. The backup agent 108 can communicate with the backup servers 128 to request the backup service and specify backup preferences 114. The backup preferences 114 can include a backup schedule to specify the frequency of the backup. For instance, the backup schedule can specify that the data backup be performed regularly, such as daily, weekly, or monthly. The backup schedule can also specify that the data backup be performed when one or more criteria are satisfied, such as when a specified event has occurred. The backup preferences 114 can also include a backup window 116 specifying a time frame during which the backup operations can take place. For example, a client can specify that a daily backup is to occur between 1 a.m. to 3 a.m. every night.

The backup preferences 114 can also include a backup option 118 specified by the client. For example, the client can select a backup option of storing all the backup data 112 on a hard drive for immediate online access, and/or to store the backup data 112 on one or more tapes and have the tapes stored in a secured vault. Different backup options can provide different levels of protection to the backup data 112. Based on the backup preferences 114, the backup servers 128 can configure the virtual data center 120 to meet the needs of the client.

To start a backup process for a client, the master server 122 can select a random or pseudo random time within the backup window 116 to initiate a secure network connection with the client computing device 104. Randomly starting the backup process can prevent attackers from predicting the current backup process based on previous backup operations and thus help to reduce the risks of the backup process being attacked or monitored by the attackers. The secure network connection can be established through an Internet protocol security ("IPSec") virtual private network ("VPN"), secure sockets layer virtual private network ("SSL-VPN"), or dedicated network circuits between the backup servers 128 and the client computing device 104. It may be noted that the client may not be able to initiate the backup process and the initiation may be restricted and controlled solely by the backup servers 128, or more specifically by the master server 122. This can further increase the security of the backup system by preventing the backup process from being launched maliciously by an attacker through a compromised client computing device 104.

The master server 122 can then send a data mover computer program 110, also referred herein as "data mover computer program 110" or "data mover 110," to be executed on the client computing device 104 by the backup agent 108 to perform the backup operations. According to some aspects of the disclosures presented herein, the data mover 110 can be generated by the master server 122 providing the source code of the data mover 110. The source code can provide a shell or a framework for the data mover 110. The client can customize the data mover 110 by modifying the source code to include software codes that are specific to the client's computing system. For example, the user 102, such as an administrator, a developer or other individuals authorized by the client, can modify the source code to add locations and/or identifications of the data to be backed up. The user 102 can insert corresponding source code to specify which portion of the client data 106 should be backed up and the paths to the directories containing those data. Further, credentials for accessing the client computing system and/or other systems where the data are located can also be added to the data mover 110. Any other information required for the backup operations can also be added to the data mover 110.

The modified source code of the data mover 110 can then be compiled at the client computing system and a copy of the compiled data mover 110 can be sent back to the master server 122 for future use. Sending the compiled data mover 110, rather than the modified source code, may prevent the client specific information in the data mover 110 from being revealed to the backup servers 128. It is possible, though, that an attacker can intercept the data mover 110 and perform reverse engineering on the data mover 110 to reveal the sensitive information. To prevent this type of attack, the source code provided by the master server 122 can include a function to encrypt the sensitive data added by the client when the modified data mover 110 is being compiled. Reverse engineering on the compiled data mover 110 thus would not reveal the unencrypted plain content. In this way, the security of the backup system is improved by preventing attackers from gaining client sensitive information by obtaining the data mover computer program 110.

For further security considerations, the data mover 110 compiled at the client computing system cannot be utilized to perform the backup operations. Because the client computing devices might have been comprised at the time of backup, the data mover 110 stored on the client computing device might not be trustworthy. Therefore, it may be beneficial to use the copy of the data mover 110 saved by the master server 122 in place of the copy stored on the client computing device 104. After receiving the data mover 110 from the master server 122, the backup agent 108 can execute the data mover 110 to retrieve data to be backed up from the proper locations using login credentials as specified by the client in the data mover 110.

To further increase the security of the backup process, the retrieved data can then be stored at a random or pseudo random location on the client computing device 104 or other computing devices associated with the client. Randomly selecting the temporary location for the backup data can prevent attackers from finding the temporary storage location based on past backup operations. The backup agent 108 can then retrieve the backup data from the temporary location and send them to the master server 122 over the secure connection created earlier. Additional security measures can be employed when transmitting the backup data to the backup data 112. For example, the backup data 112 can be encrypted and be split into multiple streams for transmission. Compression can also be applied on the encrypted backup data to further increase the security and to reduce the size of the transmitted data thereby saving network bandwidth. Upon receiving the transmitted backup data, the master server 122 can perform decompression and decryption if necessary, and then send the backup data 112 to the storage server 124 for secure storage on the data storage 126. Additional details regarding the backup operations will be provided below with regard to FIGS. 4A and 4B.

The virtual data center 120 can also allow the client to securely inspect the backup data 112 stored at the backup servers 128, for example, to find out the latest uncorrupted version of the backup data 112. To facilitate the inspection of the backup data 112, an isolated computing environment, also referred to herein as an inspection server, can be built to present a copy of the backup data 112 to the client. The inspection server is prohibited from accessing any resources outside the inspection server itself. As a result, any damages to the backup data 112 or the computing resources of the inspection server are restricted within the inspection server and can be eliminated by destroying the inspection server. Additional details regarding the inspection of the backup data 112 will be provided below with regard to FIGS. 2 and 5.

A client can retrieve the backup data 112 by sending a retrieval request the master server 122. Upon receiving the request, the master server 122 can instruct the storage server 124 to retrieve the data from the data storage 126 or from other storage medium as specified by the client. The retrieved data can be stored on a secure data repository 130 that is accessible to the client. For example, if the size of the retrieved data is small, the master server 122 can send the retrieved data to the client through secure online file sharing services, such as BOX by BOX, INC. from Redwood City, Calif., or DROPBOX by DROPBOX, INC. from San Francisco, Calif. For files with larger data sizes, repositories such as cloud object storage can be utilized to transmit the retrieved data. In either case, the retrieved data can be encrypted and securely stored by the online file sharing services. The client would need a certificate in order to be able to communicate with the repositories to retrieve the backup data 112. Sending the retrieved files in this way does not require direct network connection between the client and the server adding an additional layer of protection to the backup servers 128 and thus the backup data 112 stored thereupon. Additional details regarding retrieving the backup data 112 from the backup servers 128 will be discussed below with regard to FIG. 6.

Figure 2:
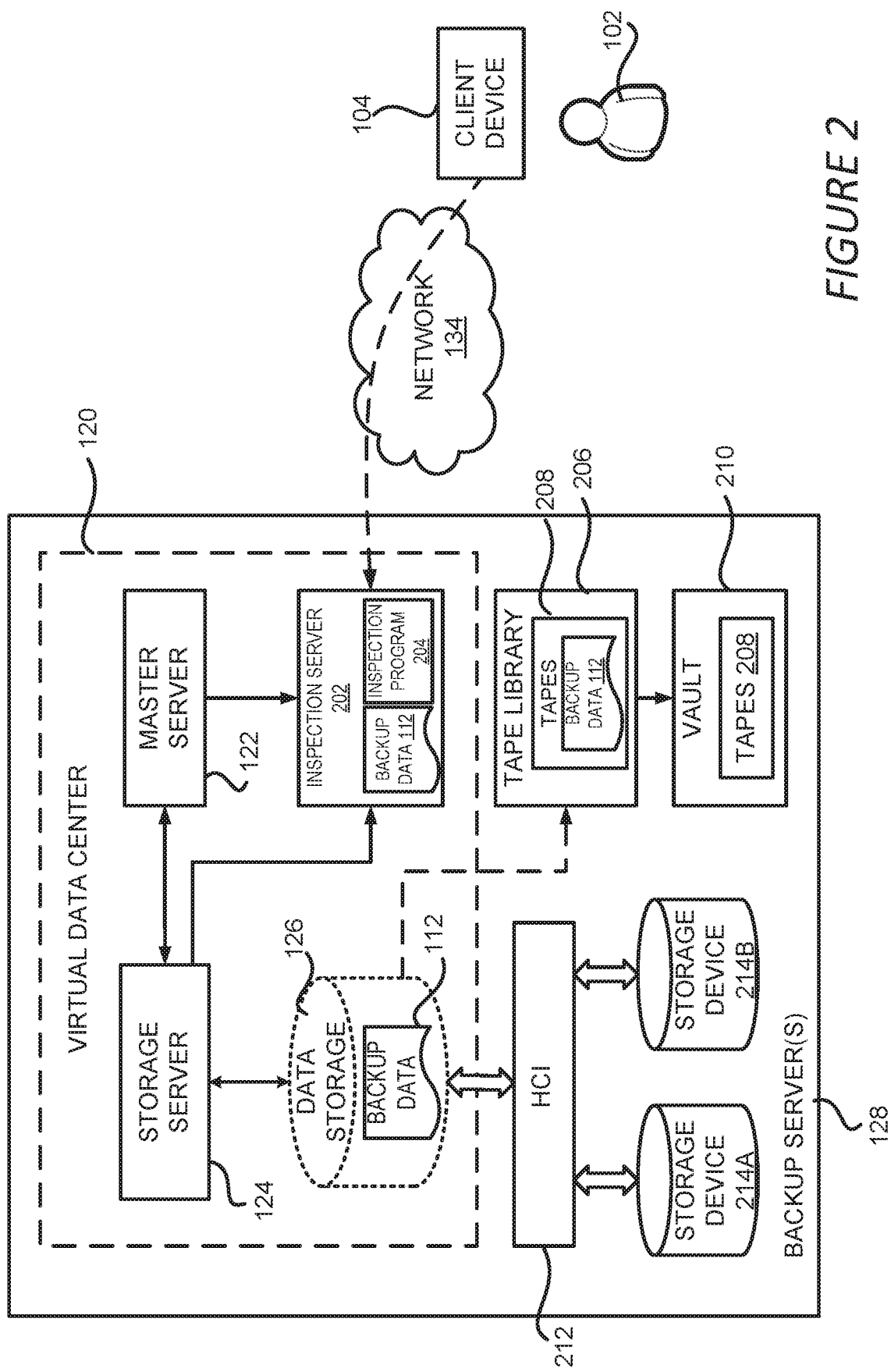
FIG. 2 shows a block diagram illustrating aspects of a virtual data center of the backup system that is dedicated to data backup for a client, according to certain aspects of the present disclosure.

Referring now to FIG. 2, where a block diagram illustrating aspects of a virtual data center 120 that is dedicated to the data backup for a client is presented. As discussed above, the virtual data center 120 can include a master server 122 for managing the backup operations for the dedicated client and maintaining index and metadata of the backup data 112. The operations of storing the backup data 112 can be handled by a storage server 124 of the virtual data center 120. The storage server 124 can be a storage infrastructure employed to manage data storage 126 and to save the backup data 112 on the data storage 126. According to some aspects of the disclosures presented herein, the data storage 126 can be virtual data storage that can be viewable and accessible only by the storage server 124.

For example, the data storage 126 can be virtual data storage constructed based on a hyper-converged infrastructure ("HCI"). HCI is a software-defined infrastructure that virtualizes all of the elements of conventional "hardware-defined" systems. The HCI can include virtualized computing, virtualized, software-defined storage, and virtualized networking. Through the HCI, one or more storage devices 214A-214B, such as hard drives, or portions thereof can be mapped to virtual data storage 126 that can be accessed only through the storage server 124 via handshaking processes. As a result, a user 102 who is authorized to access the virtual data center 120, such as an administrator of the client, cannot read, write or otherwise access the backup data 112 stored on the data storage 126. This can increase the security level of the backup data 112 by adding an additional layer of protection and preventing attacks launched from a compromised client computing device.

In addition to storing data on the storage devices such as hard disks through the virtual data storage 126, a client can also choose to store data on physical tapes 208. For instance, the client can specify through the backup option 118 that the backup data 112 should also be stored on a tape 208 dedicated to this client. Under this option, the master server 122 can instruct the storage server 124 to store the backup data 112 on the data storage 126 and also make a copy on the dedicated tape 208, for example, through a tape library 206. Compared with storing backup data 112 only on the data storage 126, this option can provide an additional copy of the backup data 112 that would be available if the copy stored on the data storage 126 are lost or damaged while still have the benefit of immediate online access of the backup data 112 through the data storage 126. Further, the physical nature of the tape can make the backup data 112 stored thereupon inaccessible through network thereby eliminating the risks of the backup data 112 being contaminated through network.

In some scenarios where the backup data 112 contain sensitive information, the client may choose to keep the backup data 112 on a tape 208 and request that the tape 208 be removed from the tape library 206 and stored in a secured vault 210 with no electronic access to the backup data 112. As a result, the backup data 112 on the tape 208 can only be retrieved by physically entering the vault 210 to take the tape 208 and mounting the tape 208 to the tape library 206.

When needed, the client can request to recover and inspect a portion or all of the backup data 112 stored by the backup servers 128. For example, a client might discover that its computing system has been compromised and some of the data stored in the client's system has been damaged or contaminated. In such a scenario, a user 102, such as an administrator, a developer or other individuals authorized by the client, can request to inspect relevant backup files from the backup data 112 stored in the virtual data center 120 in order to recover a clean version of the backup files. The user 102 can examine the backup files starting with the most recent version and progressing to older versions until a clean copy is discovered.

Upon receiving the request to inspect the backup data 112, the master server 122 can present a user interface and allow the user 102 to specify the one or more backup files to be inspected. The master server 122 can search the index of the backup data 112 to identify the backup files and request the storage server 124 to retrieve these files. The master server 122 can then have an inspection server 202 be built for the client and load a copy of the backup files into the inspection server 202. The inspection server 202 can be implemented as an isolated environment, such as a sandbox, to provide a highly controlled virtualized environment so that the inspection server 202 is prohibited from accessing resources outside the inspection server 202.

Isolating the inspection server 202 from other resources on the virtual data center 120 can allow the user 102 to perform various operations on the backup files without the risks of affecting the rest of the system. For example, the user 102 can open the backup files to view the content to examine the integrity of the files, make edits if necessary or perform other operations. If one of the backup files has been contaminated and contains malware, opening the backup file can cause the malware to be activated causing damages to the system. However, such damage cannot spread beyond the inspection server 202 because of the isolation of the inspection server 202. The contaminated inspection server 202 can be destroyed without impacting other resources on the virtual data center 120.

In most cases, backup files cannot be visually inspected by a human. It is more feasible to examine the integrity of the backup files by executing a computer software program on the backup data 112. As such, the inspection server 202 can allow the user 102 to load and execute an inspection program 204 on the inspection server 202. Allowing the execution of the inspection program 204 on the inspection server 202 would not cause security risk because of the isolated environment of the inspection server 202. As discussed above, any security issue caused by the inspection program 204 can be limited within the inspection server 202 and be eliminated upon destroying the inspection server 202. If, during the inspection, contamination is found in the backup files, the inspection server 202 can be destroyed and a new inspection server 202 can be built for the client to inspect another version of the backup files. As can be seen from the above discussion, by building the inspection server 202 as an isolated environment and making a copy of the backup data 112 in the isolated environment for inspection, the security of the backup system may be improved by limiting any potential damages caused by inspecting the backup data 112 inside the isolated environment while avoiding impact on the rest of the system including the backup data 112 stored on data storage 126.

Figure 3:
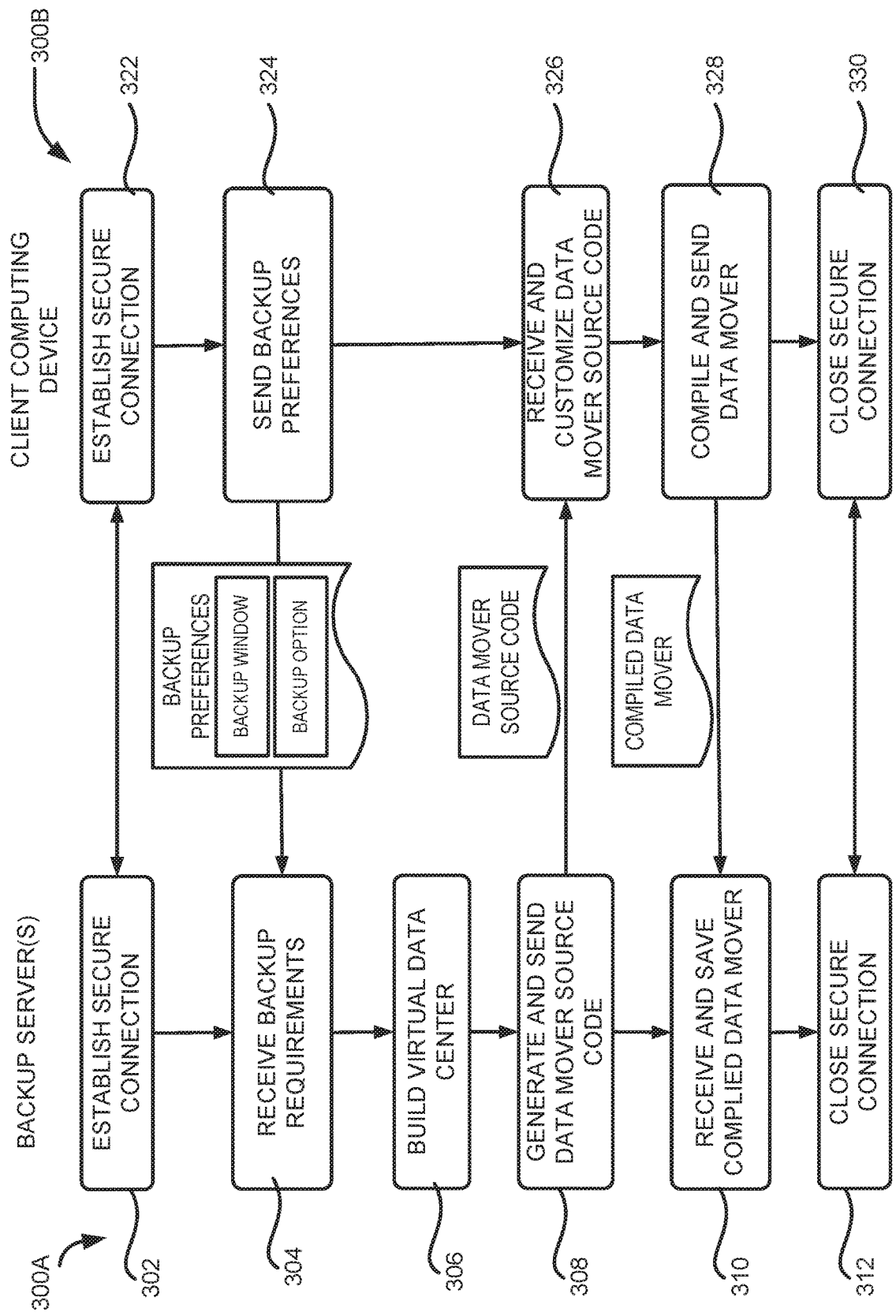
FIG. 3 includes flow chart diagrams that illustrate processes in a setup stage of the backup system, according to certain aspects of the present disclosure.

FIG. 3 shows flow chart diagrams that illustrate processes 300A and 300B in a setup stage of the backup system 100, according to certain aspects of the present disclosure. In particular, the process 300A illustrates aspects of the backup servers 128 and the process 300B illustrates aspects of the client computing device 104 with regard to the disclosure presented above relating to FIG. 1. The processes 300A and 300B will be described together below.

The process 300A begins at operation 302 where the backup servers 128 establish a secure connection with the client computing device 104. The process 300B begins at operation 322, where the client computing device 104 accepts the secure connection established by the backup servers 128. After the secure connection is established, the client computing device 104 can specify backup preferences 114 and send the backup preferences 114 to the backup servers 128 at operation 324 of the process 300B. As discussed above, the backup preferences 114 can include a backup schedule to specify the frequency of the backup. The backup preferences 114 can also include a backup window 116 specifying a time frame during which the backup operations can take place.

The backup preferences 114 can also include a backup option indicating how and where the backup data can be stored. The client can choose to store the master server 122 on one or more electronic storage devices 214, such as hard disks, through the virtual data storage 126 constructed based on the HCI so that the backup data 112 can be accessed instantly. The client can also choose to save an additional copy of the backup data 112 on one or more dedicated tapes 208 through a tape library 206 so that the backup data 112 can still be available even if the copy on the data storage 126 is lost or otherwise damaged. For particularly sensitive backup data 112, the client may choose to save a copy on one or more dedicated tapes 208 and have the tapes 208 stored in a vault 210.

The backup servers 128 receive the backup preferences 114 at operation 304 of the process 300A. The backup servers 128 can then build a virtual data center 120 at operation 306 dedicated to the client. The process 300A then proceeds to operation 308, where the backup servers 128 can generate and send source code for a data mover computer program 110. The source code can provide a shell or a framework containing basic functions for the data mover 110. The client computing device 104 receives the source code of the data mover 110 at operation 326 of process 300B. The client computing device 104 can customize the source code by adding, for example, locations and/or identifications of the data to be backed up and, if necessary, credentials for accessing the client computing system and/or other systems where the data are located, as well as other type of information.

From operation 326, the process 300B proceeds to operation 328 where the client computing device 104 can have the modified data mover 110 be compiled in the client computing system. The compiled data mover 110 can be sent to the backup servers 128. The backup servers 128 receive the compiled data mover 110 at operation 310 of the process 300A and saves it at a secure location for future use. The process 300A then proceeds to operation 312, where the backup servers 128 close the secure connection with the client computing device 104 and the process 300A ends. From operation 328, the process 300B proceeds to operation 330, where the client computing device 104 also closes the secure connection with the backup servers 128 and ends the process 300A.

Figure 4A:
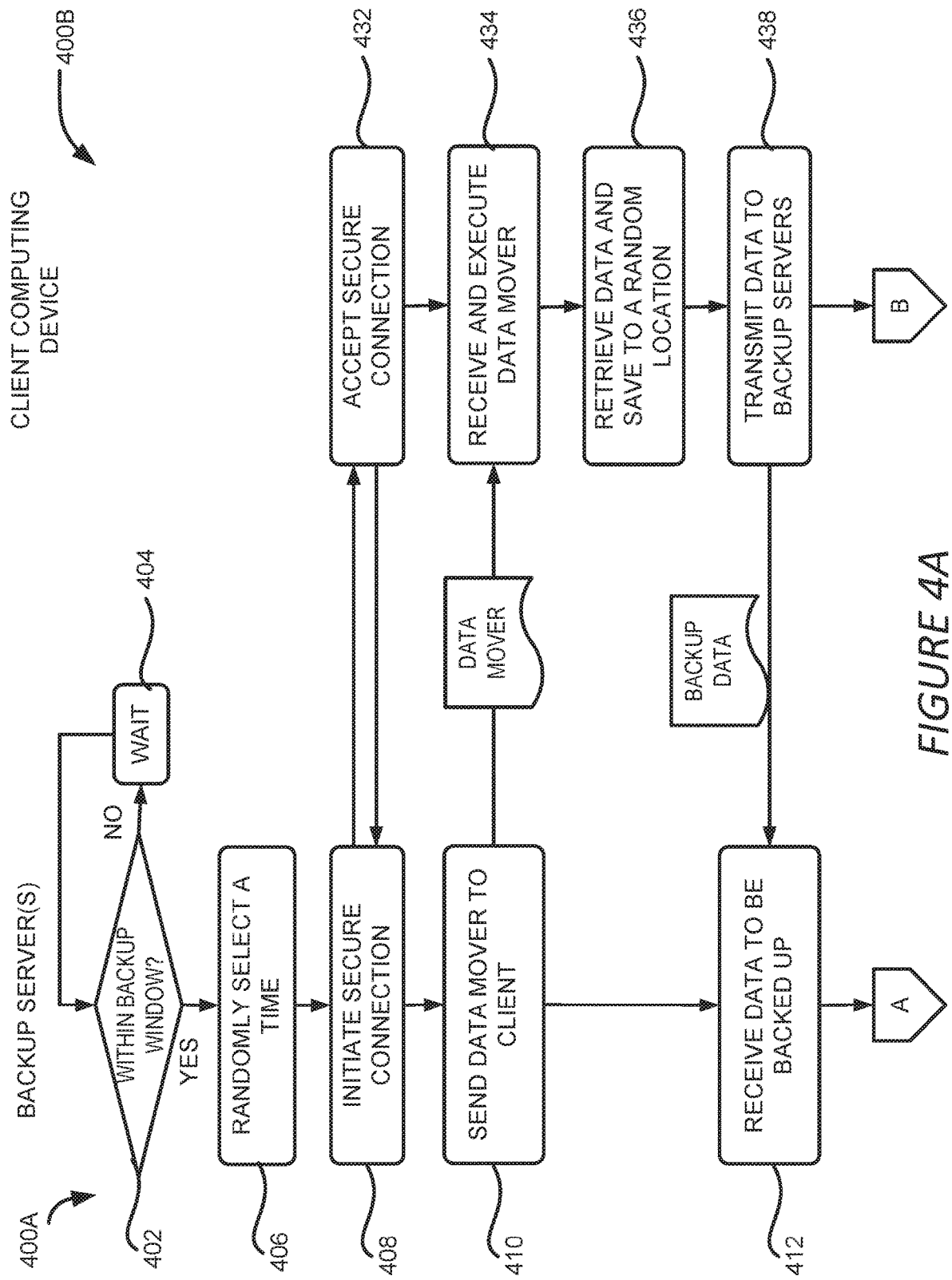
FIGS. 4A and 4B include flow chart diagrams that illustrate processes in a backup stage of the backup system, according to certain aspects of the present disclosure.
Figure 4B:
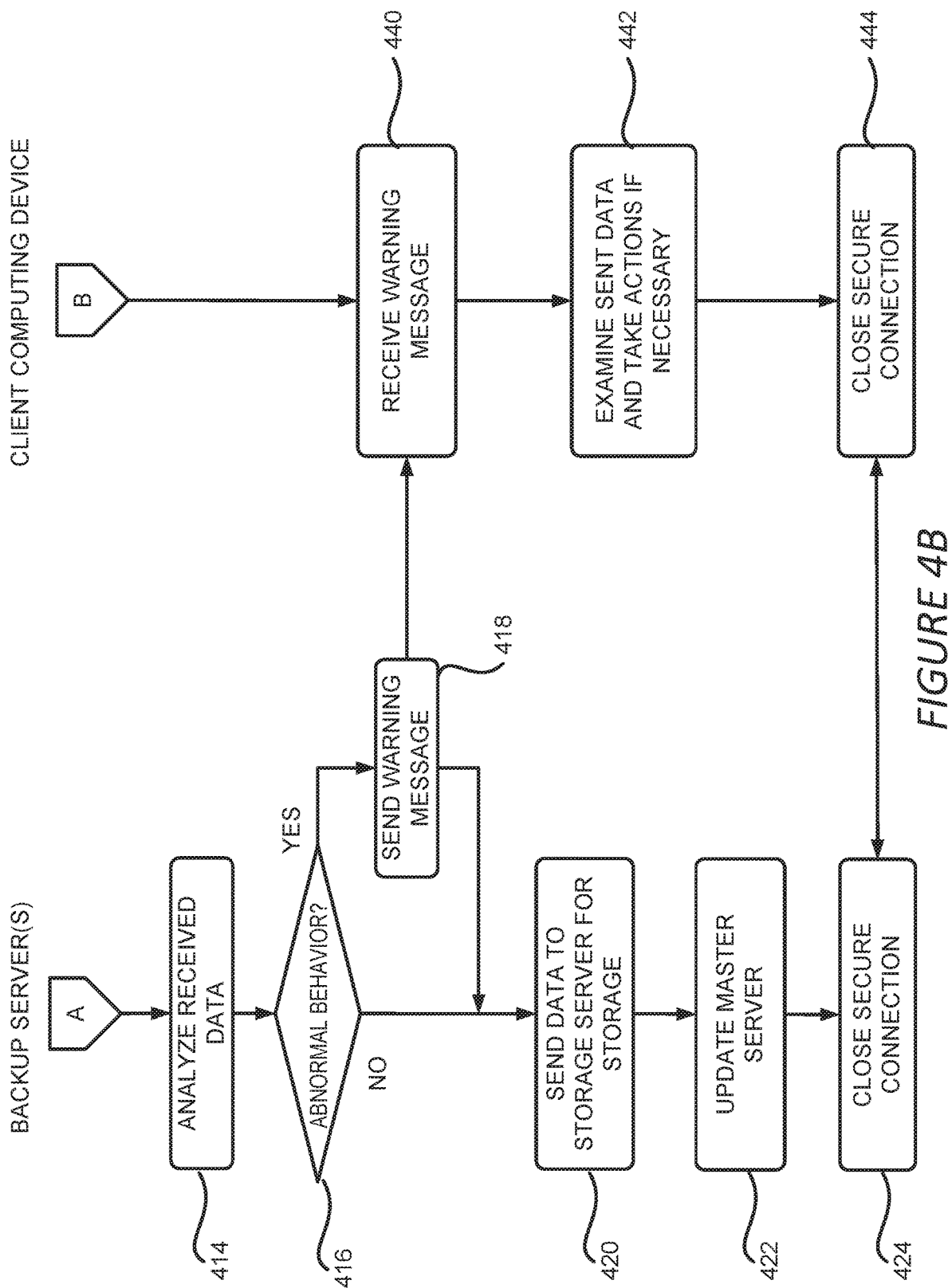

FIGS. 4A and 4B show flow chart diagrams that illustrate processes 400A and 400B in a backup stage of the backup system, according to certain aspects of the present disclosure. In particular, the process 400A illustrates aspects of the backup servers 128 and the process 400B illustrates aspects of the client computing device 104 with respect to the disclosure presented above regarding FIG. 1. The processes 400A and 400B will be described together below.

The process 400A begins at operation 402 where the backup servers 128, or more specifically the master server 122, determines whether it is within the backup window specified by the client in the backup preferences 114. If not, the process 400A proceeds to operation 404 where the master server 122 waits for a pre-determined period of time or a random or pseudo random time period before making the determination again. If it is determined at operation 402 that it is within the backup window, the process 400A proceeds to operation 406 where the master server 122 can select a random or pseudo random time to start the backup process.

The process 400A then proceeds to operation 408, where the master server 122 can initiate a secure network connection with the client computing device 104. The secure network connection can be initiated through an IPSec VPN, SSL-VPN and or dedicated network circuits between the backup servers 128 and the client computing device 104. The process 400B starts at operation 432, where the client computing device 104 receives and accepts the secure connection request from the master server 122. An acknowledgement of accepting the secure connection can be sent to the master server 122. It may be noted that the client computing device 104 may be prohibited from initiating the secure network connection for the data backup process and the initiation may be restricted and controlled solely by the master server 122.

Once the secure network connection is established, the process 400A proceeds to operation 410 where the master server 122 can send a copy of the previously received compiled data mover 110 to the client computing device 104. The client computing device 104 receives the data mover 110 at operation 434 of the process 400B and executes the data mover 110 on the backup agent 108. The process 400B then proceeds to operation 436 where the execution of the data mover 110 causes the client computing device 104 to retrieve the data to be backed up and save them at a random or pseudo random location on the client computing device 104 or other computing devices associated with the client.

From operation 436, the process 400B proceeds to operation 438 where the backup data 112 can be transmitted to the master server 122. As discussed above, to ensure a secure transmission of the backup data 112, the backup data 112 can be encrypted and further split into multiple streams for transmission. Compression can also be applied on the encrypted backup data to further increase the security and to reduce the size of the transmitted data.

The master server 122 receives the transmitted backup data 112 at operation 412 of the process 400A. At operation 414, the master server 122 can perform analysis on the received backup data 112 within an isolated environment such as a sandbox. The sandbox can provide protection to the backup servers 128 against any malware, which might be embedded in the backup data 112. The analysis can be performed by evaluating the characteristics of the backup data 112 against standard profiles, such as through a machine learning model, to determine if the backup data 112 contain any abnormality. As discussed above, the ransomware attacks have become more and more sophisticated and it becomes harder to detect these attacks. By utilizing machine learning models, these attacks can be predicted by identifying unusual behaviors associated with the backup process and/or the backup data 112. For instance, the number of files involved in a backup can be an indicator of potential attacks. If the number of files in a specific backup is significantly more or less than a typical backup, then it is possible that the client computing system and the backup data 112 have been attacked. Other factors can be utilized for the abnormality detection, such as the number of modifications in a backup or the overall data size of the backup. It may be beneficial for the client to be notified of the abnormality so that the client can identify potential attacks early on to avoid further damages.

The process 400A then proceeds to operation 416 to determine whether any abnormal behaviors have been detected in the current backup. If so, the process 400A proceeds to operation 418 where the master server 122 can send a warning message to the client computing device 104 to bring the abnormal behaviors to the client's attention. The process 400A then proceeds to operation 420 where the received backup data 112 can be sent to the storage server 124 for storage based on the backup options selected by the client.

The master server 122 can then update itself to record information associated with the current backup, such as the index of the files contained in the backup data 112, the time stamp of the backup, the number of files contained in the backup data 112, the size of each backup files, and so on. From operation 422, the process 400A proceeds to operation 424 to close the secure network connection with the client computing device 104.

After receiving the warning message about the backup data 112 at operation 440, the process 400B proceeds to operation 442 where the client computing device 104 can examine the backup data 112 to identify any potential problem associated with the backup data 112 or the system, and to take actions if necessary. The process 400B then proceeds to operation 444, where the client computing device 104 can close the secure network connection with the master server 122 to finish the backup process.

FIG. 5 includes flow chart diagrams that illustrate processes 500A and 500B of a data inspection stage of the backup system 100, according to certain aspects of the present disclosure. In particular, the process 500A illustrates aspects of the backup servers 128 and the process 500B illustrates aspects of the client computing device 104 with regard to the disclosure presented above with regard to FIGS. 1 and 2. The processes 500A and 500B will be described together below.

The process 500B begins at operation 502 where the client computing device 104 sends a request to inspect the backup data 112 to the backup servers 128, or more specifically, the master server 122. As discussed above, the client might decide to inspect the backup data 112 when the client determines that its system and/or the primary data have been compromised and wants to find a clean copy of the data from the backup data 112. Therefore, it is likely that some versions of the backup data 112 stored by the backup servers 128 are also contaminated. In order to find the latest version of the clean data, the client can start with the latest version of the backup data and progress to older versions until a clean copy is identified.

The request to inspect the backup data 112 is received by the master server 122 at operation 502 of the process 500A. At operation 504, the master server 122 can present a user interface to the client so that a user 102 of the client computing device 104 can select or otherwise specify the backup files to be inspected at operation 524 of the process 500B. At operation 526, the user 102 can further send an inspection program 204 for examining the integrity of the backup files to the master server 122. The master server 122 receives the selected backup files to be inspected and the inspection program 204 at operation 506 of the process 500A.

The master server 122 then creates an inspection server 202 for the client at operation 508 of the process 500A. As discussed above, the inspection server 202 can be built to be an isolated environment. For example, the inspection server 202 can be implemented as a sandbox to provide a highly controlled virtualized environment in that the inspection server 202 is prohibited from accessing resources outside the inspection server 202. The process 500A then proceeds to operation 510, where the master server 122 can instruct the storage server 124 to retrieve the backup files to be inspected from the data storage 126 or other places specified by the client. The master server 122 then loads a copy of the backup files as well as the inspection program 204 on the inspection server 202.

At operation 528 of the process 500B, the user 102 of the client computing device 104 can log into the inspection server 202 and perform the inspection on the backup files either through visual inspection or by using the inspection program 204. After the user 102 finishes the inspection or otherwise finds problems in the backup files, the user 102 can send a request to the master server 122 to exit the inspection process at operation 530 of the process 500B. The request to exit is received by the master server 122 at operation 512 and the master server 122 can further destroy the inspection server 202 to avoid any damages to the backup servers 128 by the inspected files or the inspection program. The process 500A then proceeds to operation 514 where it ends. From operation 530, the process 500B proceeds to operation 532, where it ends. If the client wants to inspect more backup files, such as to inspect an earlier version of the files, the client can start the process 500B by sending another request to inspect.

Figure 6:
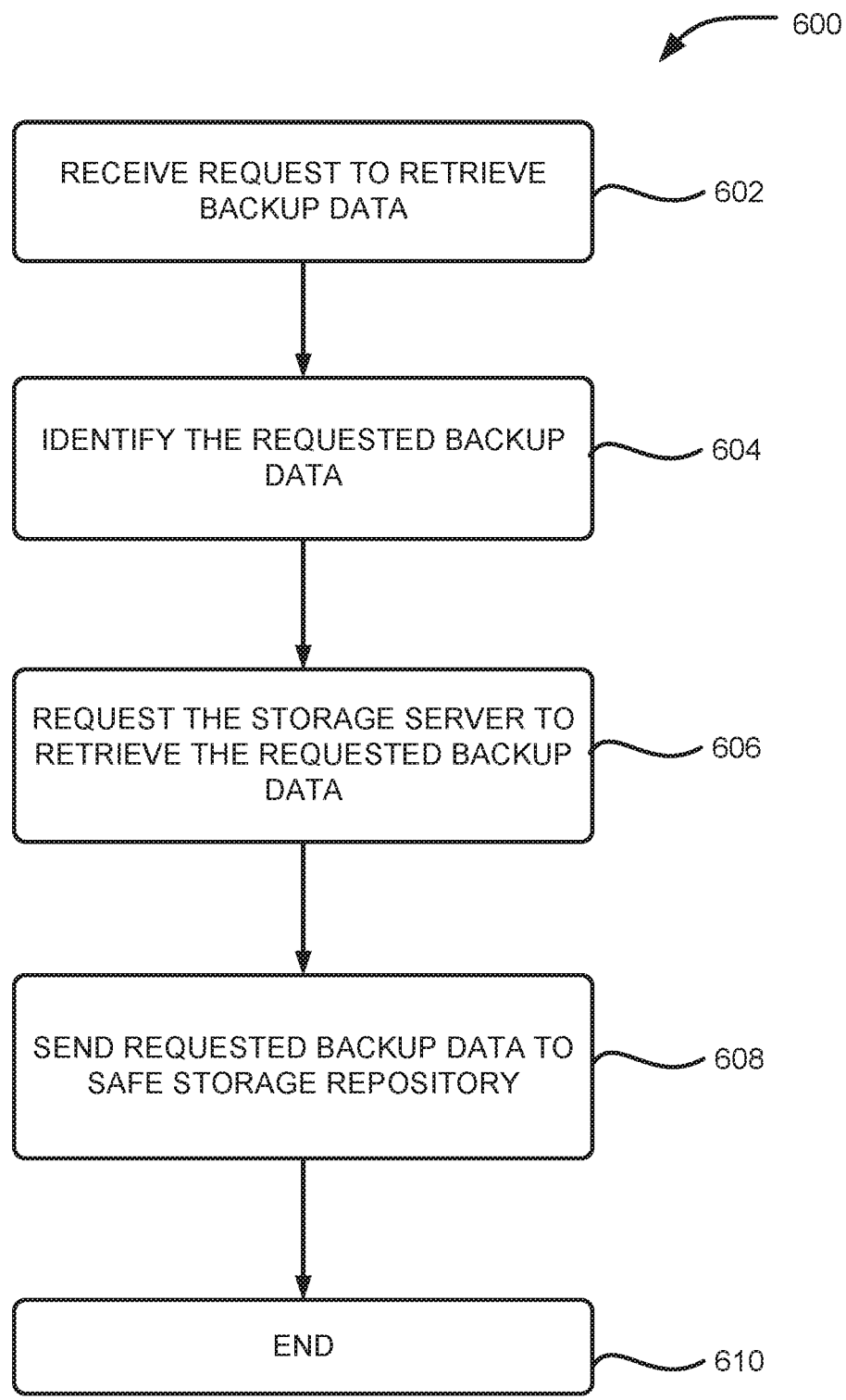
FIG. 6 shows a flow chart of a process for preparing backup data for retrieval, according to certain aspects of the present disclosure.

FIG. 6 shows a flow chart of a process 600 for preparing backup data 112 for retrieval, according to certain aspects of the present disclosure. The process 600 starts at operation 602 where a request to retrieve the backup data 112 is received from the client. The process 600 then proceeds to operation 604 where the master server 122 identifies the requested backup data based on the index stored thereupon. The process 600 then proceeds to operation 606 where the master server 122 requests the storage server 124 to retrieve the identified the backup data from the data storage 126 or other storage media selected by the client for storing the backup data 112. At operation 608, the master server 122 can send the requested backup data to a secure data repository 130 that is accessible by the client. The client can then use its certificate or credentials to retrieve the backup data from the secure data repository 130. From operation 608, the process 600 proceeds to operation 610, where it ends.

Figure 7:
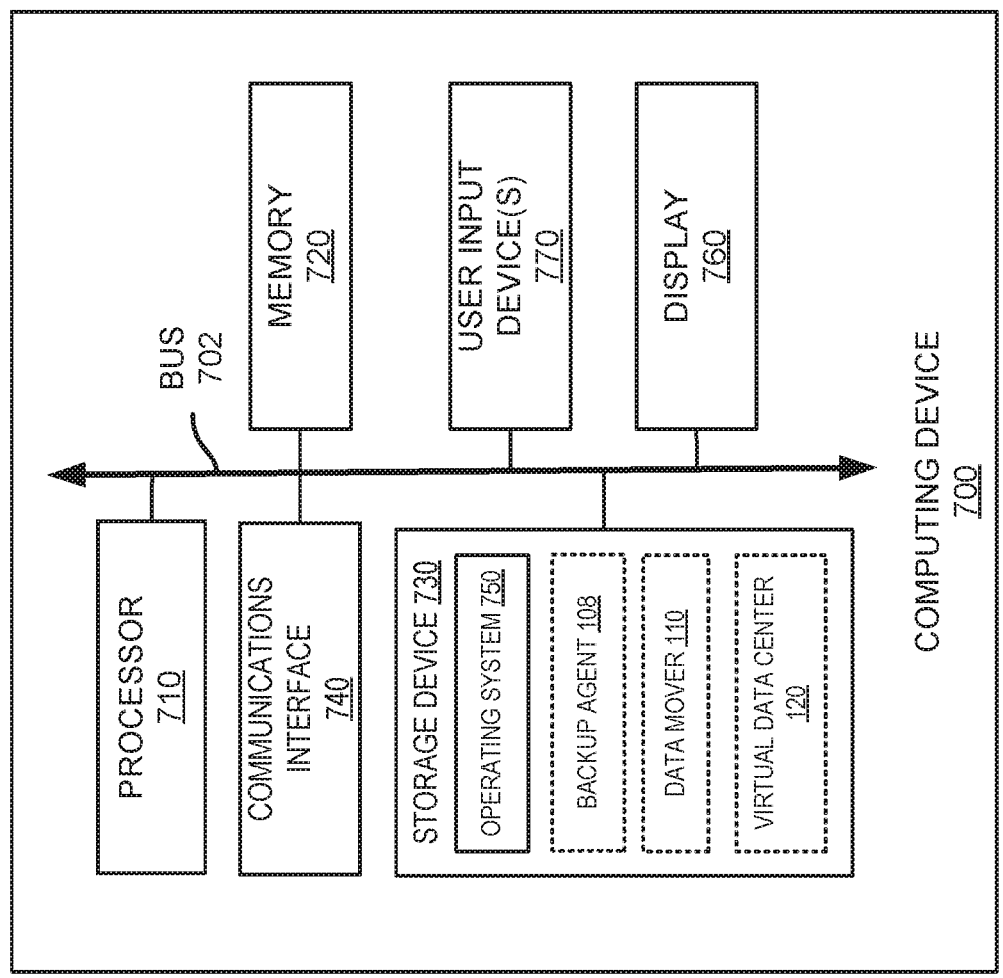
FIG. 7 shows an example computing device suitable for implementing aspects of the techniques and technologies presented herein.

FIG. 7 shows an example computing device suitable for implementing aspects of the techniques and technologies presented herein. The example computing device 700 includes a processor 710 which is in communication with the memory 720 and other components of the computing device 700 using one or more communications buses 702. The processor 710 is configured to execute processor-executable instructions stored in the memory 720 to perform secure data protection and recovery according to different examples, such as part or all of the example processes 300A or 300B, 400A or 400B, 500A or 500B and 600 described above with respect to FIGS. 3-6. The computing device, in this example, also includes one or more user input devices 770, such as a keyboard, mouse, touchscreen, microphone, etc., to accept user input. The computing device 700 also includes a display 760 to provide visual output to a user.

The computing device 700 can also include or be connected to one or more storage devices 730 that provides non-volatile storage for the computing device 700. The storage devices 730 can store an operating system 750 utilized to control the operation of the computing device 700. The storage devices 730 can also store other system or application programs and data utilized by the computing device 700, such as modules implementing the functionalities provided by the backup agent 108 and data mover 110 if the computing device 700 represents the client computing device 104, or the virtual data center 120 if the computing device 700 represents a backup server 128. The storage devices 730 might also store other programs and data not specifically identified herein.

The computing device 700 can include a communications interface 640. In some examples, the communications interface 740 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate arrays (FPGAs) specifically, to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: initiating, by a backup server, a connection for backing up data to a computing device of a computing system associated with a data owner at a random or pseudo random time point within a backup window specified by the data owner; sending, by the backup server to the computing device, a computer program compiled on the computing system, wherein the computer program is configured to retrieve backup data from one or more storage devices associated with the data owner, to store the backup data at a random or pseudo random location in the computing system and to send the backup data to the backup server; receiving, by the backup server, the backup data from the computing device; and causing, by the backup server, the backup data to be stored in data storage.

Example 2 is the computer-implemented method of example 1, wherein the computing device is prohibited from initiating the connection for backing up data with the backup server.

Example 3 is the computer-implemented method of examples 1-2, further comprising building a virtual data center dedicated to the data owner, wherein the virtual data center comprises a storage infrastructure configured to receive and store the backup data in the data storage.

Example 4 is the computer-implemented method of examples 1-3, wherein the data storage is a virtual data storage built using a hyper-converged infrastructure (HCI) from one or more hard drives.

Example 5 is the computer-implemented method of examples 1-4, wherein the virtual data center further comprises a master server configured to perform one or more of managing backups of the data owner, maintaining metadata of the backup data stored by the storage infrastructure or hosting an inspection server for inspecting the backup data.

Example 6 is the computer-implemented method of examples 1-5, further comprising: prior to initiating the connection for backing up data, sending, by the backup server, a source code of the computer program to the computing device, the source code configured to enable the data owner to add one or more of locations for obtaining the backup data or to add credentials for logging into the computing system; receiving the computer program compiled in the computing system; and saving a copy of the computer program.

Example 7 is the computer-implemented method of example 1-6, wherein the data storage comprises one or more tapes.

Example 8 is a data backup system, comprising: one or more storage devices; and one or more computing devices configured to execute a virtual data center configured to: initiate a connection for backing up data to a computing system associated with a data owner at a random or pseudo random time point within a backup window specified by the data owner; send, to the computing system, a computer program compiled in the computing system, wherein the computer program is configured to retrieve backup data from at least one storage device associated with the data owner, to store the backup data at a random or pseudo random location in the computing system and to send the backup data to the virtual data center; receive the backup data from the computing system; and store the backup data on the one or more storage devices.

Example 9 is the data backup system of example 8, wherein the backup data is stored on the one or more storage devices through a virtual data storage built using a hyper-converged infrastructure (HCI).

Example 10 is the data backup system of examples 8-9, wherein the computing system is prohibited from initiating the connection for backing up data with the virtual data center.

Example 11 is the data backup system of examples 8-10, wherein the virtual data center is further configured to: receive a request to inspect the backup data, the request specifying one or more backup files to be inspected; build an inspection server for inspecting the backup data, the inspection server comprising an isolated environment prohibited from accessing resources outside the inspection server; and copy the one or more backup files to the inspection server and present a user interface for inspecting the one or more backup files.

Example 12 is the data backup system of examples 8-11, wherein the virtual data center is further configured to: receive an inspection program provided by the data owner; and execute, on the inspection server, the inspection program to determine an integrity of the one or more backup files.

Example 13 is a non-transitory computer-readable medium comprising computer-executable instructions to cause a computer to: initiate a connection for backing up data to a computing device of a computing system associated with a data owner at a random or pseudo random time point within a backup window specified by the data owner; send, to the computing device, a computer program compiled in the computing system, wherein the computer program is configured to retrieve backup data from at least one storage device associated with the data owner, to store the backup data at a random or pseudo random location in the computing system and to send the backup data to the computer; receive the backup data from the computing device; and store the backup data on data storage.

Example 14 is the non-transitory computer-readable medium of example 13, comprising further computer-executable instructions to cause the computer to: receive a request to retrieve one or more backup files from the backup data; locate the one or more backup files; and make the one or more backup files retrievable by copying the one or more backup files from the data storage to a data repository accessible to the data owner.

Example 15 is the non-transitory computer-readable medium of examples 13-14, comprising further computer-executable instructions to cause the computer to: prior to initiating the connection for backing up data, send a source code of the computer program to the computing device, the source code configured to allow the data owner to add one or more locations for obtaining the backup data or to add credentials for logging into the computing system; receive the computer program complied in the computing system; and save a copy of the computer program.

Example 16 is the non-transitory computer-readable medium of examples 13-15, wherein the data storage is a virtual data storage built using a hyper-converged infrastructure (HCI) from one or more hard drives.

Example 17 is a computer-implemented method, comprising: receiving a source code of a computer program for backing up data; modifying the source code of the computer program to include information for accessing backup data; compiling the source code of the computer program to generate an executable computer program and sending the executable computer program to a backup server; accepting, at a computing device, a request for a secure connection for backing up data with the backup server; receiving, at the computing device, the executable computer program from the backup server; executing, at the computing device, the executable computer program to retrieve the backup data; saving, by the computing device, the backup data at a random or pseudo random location; and sending, by the computing device, the backup data to the backup server.

Example 18 is the computer-implemented method of example 17, wherein the computing device is prohibited from initiating the secure connection for backing up data with the backup server.

Example 19 is the computer-implemented method of examples 17-18, wherein the information for accessing backup data comprises one or more of locations of the backup data or credentials for accessing a computing system hosting the backup data.

Example 20 is the computer-implemented method of examples 17-19, further comprising: sending a request to inspect the backup data and an inspection program to the backup server, the request specifying one or more backup files to be inspected and the inspection program configured to inspect the backup files; connecting to an inspection server; and causing the inspection program to be executed on the inspection server.

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A computer-implemented method, comprising:
    initiating, by a backup server, a connection for backing up data to a computing device of a computing system associated with a data owner at a random or pseudo random time point within a backup window, wherein the backup window is determined by the data owner;
    sending, by the backup server to the computing device, a computer program that has been compiled on the computing system to include information for accessing backup data from one or more storage devices associated with the data owner, wherein the computer program is configured to retrieve backup data from the one or more storage devices, to store the backup data at a random or pseudo random location in the computing system and to send the backup data to the backup server;

receiving, by the backup server, the backup data from the computing device; and causing, by the backup server, the backup data to be stored in data storage.

2. The computer-implemented method of claim 1, wherein the computing device is prohibited from initiating the connection for backing up data with the backup server.

3. The computer-implemented method of claim 1, further comprising building a virtual data center dedicated to the data owner, wherein the virtual data center comprises a storage infrastructure configured to receive and store the backup data in the data storage.

4. The computer-implemented method of claim 3, wherein the data storage is a virtual data storage built using a hyper-converged infrastructure (HCI) from one or more hard drives.

5. The computer-implemented method of claim 3, wherein the virtual data center further comprises a master server configured to perform one or more of managing backups of the data owner, maintaining metadata of the backup data stored by the storage infrastructure or hosting an inspection server for inspecting the backup data.

6. The computer-implemented method of claim 1, further comprising:

prior to initiating the connection for backing up data, sending, by the backup server, a source code of the computer program to the computing device, the source code configured to enable the data owner to add one or more of locations for obtaining the backup data or to add credentials for logging into the computing system;

receiving the computer program compiled in the computing system; and saving a copy of the computer program.

7. The computer-implemented method of claim 1, wherein the data storage comprises one or more tapes.

8. A data backup system, comprising:

one or more storage devices; and one or more computing devices configured to execute a virtual data center configured to:

initiate a connection for backing up data to a computing system associated with a data owner at a random or pseudo random time point within a backup window, wherein the backup window is determined by the data owner;

send, to the computing system, a computer program that has been compiled on the computing system to include information for accessing backup data from at least one storage device associated with the data owner, wherein the computer program is configured to retrieve backup data from the at least one storage device, to store the backup data at a random or pseudo random location in the computing system and to send the backup data to the virtual data center;

receive the backup data from the computing system; and store the backup data on the one or more storage devices.

9. The data backup system of claim 8, wherein the backup data is stored on the one or more storage devices through a virtual data storage built using a hyper-converged infrastructure (HCI).

10. The data backup system of claim 8, wherein the computing system is prohibited from initiating the connection for backing up data with the virtual data center.

11. The data backup system of claim 8, wherein the virtual data center is further configured to:

receive a request to inspect the backup data, the request specifying one or more backup files to be inspected;

build an inspection server for inspecting the backup data, the inspection server comprising an isolated environment prohibited from accessing resources outside the inspection server; and copy the one or more backup files to the inspection server and present a user interface for inspecting the one or more backup files.

12. The data backup system of claim 11, wherein the virtual data center is further configured to:

receive an inspection program provided by the data owner; and execute, on the inspection server, the inspection program to determine an integrity of the one or more backup files.

13. A non-transitory computer-readable medium comprising computer-executable instructions to cause a computer to:

initiate a connection for backing up data to a computing device of a computing system associated with a data owner at a random or pseudo random time point within a backup window, wherein the backup window is determined by the data owner;

send, to the computing device, a computer program that has been compiled on the computing system to include information for accessing backup data from at least one storage device associated with the data owner, wherein the computer program is configured to retrieve backup data from the at least one storage device, to store the backup data at a random or pseudo random location in the computing system and to send the backup data to the computer;

receive the backup data from the computing device; and store the backup data on data storage.

14. The non-transitory computer-readable medium of claim 13, comprising further computer-executable instructions to cause the computer to:

receive a request to retrieve one or more backup files from the backup data;

locate the one or more backup files; and make the one or more backup files retrievable by copying the one or more backup files from the data storage to a data repository accessible to the data owner.

15. The non-transitory computer-readable medium of claim 13, comprising further computer-executable instructions to cause the computer to:

prior to initiating the connection for backing up data, send a source code of the computer program to the computing device, the source code configured to allow the data owner to add one or more of locations for obtaining the backup data or to add credentials for logging into the computing system;

receive the computer program complied in the computing system; and save a copy of the computer program.

16. The non-transitory computer-readable medium of claim 13, wherein the data storage is a virtual data storage built using a hyper-converged infrastructure (HCI) from one or more hard drives.

17. A computer-implemented method, comprising:

receiving a source code of a computer program for backing up data;

modifying the source code of the computer program to include information for accessing backup data;

compiling the source code of the computer program to generate an executable computer program and sending the executable computer program to a backup server;

accepting, at a computing device, a request for a secure connection for backing up data with the backup server;

receiving, at the computing device, the executable computer program from the backup server;

executing, at the computing device, the executable computer program to retrieve the backup data;

saving, by the computing device, the backup data at a random or pseudo random location; and sending, by the computing device, the backup data to the backup server.

18. The computer-implemented method of claim 17, wherein the computing device is prohibited from initiating the secure connection for backing up data with the backup server.

19. The computer-implemented method of claim 17, wherein the information for accessing backup data comprises one or more of locations of the backup data or credentials for accessing a computing system hosting the backup data.

20. The computer-implemented method of claim 17, further comprising:

sending a request to inspect the backup data and an inspection program to the backup server, the request specifying one or more backup files to be inspected and the inspection program configured to inspect the backup files;

connecting to an inspection server; and causing the inspection program to be executed on the inspection server.

* * * * *